(12) United States Patent
Faaborg et al.

(10) Patent No.: US 9,319,369 B2
(45) Date of Patent: *Apr. 19, 2016

(54) DEFERRING ALERT OF NOTIFICATIONS FOR A PARTICULAR TIME

(71) Applicant: Google Inc., Mountain View, CA (US)

(72) Inventors: Alexander Faaborg, Mountain View, CA (US); Austin Robison, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,729

(22) Filed: Mar. 19, 2015

(65) Prior Publication Data
US 2015/0195240 A1 Jul. 9, 2015

Related U.S. Application Data

(63) Continuation of application No. 14/092,164, filed on Nov. 27, 2013, now Pat. No. 9,024,747.

(51) Int. Cl.
*H04L 12/58* (2006.01)
*G08B 5/22* (2006.01)
*H04M 1/725* (2006.01)

(52) U.S. Cl.
CPC ........ *H04L 51/24* (2013.01); *G08B 5/22* (2013.01); *H04L 51/22* (2013.01); *H04M 1/72566* (2013.01)

(58) Field of Classification Search
CPC .... G06Q 10/109; G06Q 10/107; H04L 51/24; H04M 1/72552

USPC .......... 340/7.2, 7.21, 7.22, 7.23, 527, 539.11, 340/540; 709/206, 207

See application file for complete search history.

(56) References Cited

U.S. PATENT DOCUMENTS

| 7,496,630 | B2 | 2/2009 | Arellano et al. |
| 8,321,515 | B1 | 11/2012 | Gailloux et al. |
| 8,452,266 | B2 | 5/2013 | Chiu et al. |
| 2001/0042136 | A1 | 11/2001 | Guedalia et al. |
| 2003/0229722 | A1 | 12/2003 | Beyda |
| 2009/0222527 | A1 | 9/2009 | Arconati et al. |
| 2010/0222027 | A1 | 9/2010 | Scott et al. |
| 2010/0257412 | A1 | 10/2010 | Acuna et al. |

(Continued)

FOREIGN PATENT DOCUMENTS

EP 1189397 B1 4/2006

OTHER PUBLICATIONS

International Search Report and Written Opinion from International Application No. PCT/US2014/057475, dated Aug. 11, 2015, 13 pp.

(Continued)

*Primary Examiner* — Mark Rushing
(74) *Attorney, Agent, or Firm* — Shumaker & Sieffert, P.A.

(57) ABSTRACT

A computing system is described that receives, at a particular time, notification data, the notification data indicating a threshold amount of time for which the computing system is to delay outputting an alert based on the notification data. The computing system initiates, based on the threshold amount of time, a deferred output of the alert based on the notification data. Responsive to determining that the threshold amount of time has elapsed since the particular time, the computing system outputs the alert based on the notification data.

20 Claims, 5 Drawing Sheets

(56) References Cited

U.S. PATENT DOCUMENTS

| | | |
|---|---|---|
| 2011/0102172 A1 | 5/2011 | Chiu et al. |
| 2012/0218578 A1 | 8/2012 | Tanaka |
| 2012/0246246 A1 | 9/2012 | Moore |
| 2012/0311045 A1 | 12/2012 | Sylvain |
| 2012/0313780 A1 | 12/2012 | Stout et al. |

OTHER PUBLICATIONS

"Django-mailer," [online]. First Accessed on Aug. 22, 2013. Retrieved from the Internet: <https://code.google.com/p/django-mailer/> 2 pgs.

U.S. Appl. No. 14/092,164, filed Nov. 27, 2013 by Alexander Faaborg et al.

Prosecution History from U.S. Appl. No. 14/092,164 from Feb. 6, 2014 through Jan. 30, 2015 62 pp.

DEFERRING ALERT OF NOTIFICATIONS FOR A PARTICULAR TIME

This application is a Continuation of application Ser. No. 14/092,164, filed on Nov. 27, 2013, the entire content of which is hereby incorporated by reference.

BACKGROUND

A computing device may receive notification data at various times of day, and with varying frequency. The computing device may output an alert indicative of the receipt of notification data each time that notification data is received. For instance, a computing device may receive notification data that indicates that a new instant message was received by a messaging service associated with the computing device. Responsive to receiving the instant message notification data, the computing device may output an audible and/or visual alert based on the notification data to indicate to a user of the computing device that the new instant message was received. A computing device may output an alert each time that that the computing device receives new notification data and as a result, the computing device may output frequent, and sometimes numerous, alerts at various times of day.

SUMMARY

In one example, the disclosure is directed to a method that includes receiving, by a computing device, at a particular time, notification data, the notification data indicating a threshold amount of time for which the computing device is to delay outputting an alert based on the notification data. The method further includes initiating, by the computing device and based on the threshold amount of time, a deferred output of the alert based on the notification data. The method further includes responsive to determining that the threshold amount of time has elapsed since the particular time, outputting, by the computing device, the alert based on the notification data.

In another example, the disclosure is directed to a computing system that includes at least one processor and at least one module operable by the at least one processor to receive, at a particular time, notification data, the notification data indicating a threshold amount of time for which the computing system is to delay outputting an alert based on the notification data. The at least one module is further operable by the at least one processor to initiate, based on the threshold amount of time, a deferred output of the alert based on the notification data. The at least one module is further operable by the at least one processor to responsive to determining that the threshold amount of time has elapsed since the particular time, output the alert based on the notification data.

In another example, the disclosure is directed to a computer readable storage medium including instructions that, when executed, configure one or more processors of a computing system to receive, at a particular time, notification data, the notification data indicating a threshold amount of time for which the computing system is to delay outputting an alert based on the notification data. The computer readable storage medium includes further instructions that, when executed, configure the one or more processors of the computing system to initiate, based on the threshold amount of time, a deferred output of the alert based on the notification data, and responsive to determining that the threshold amount of time has elapsed since the particular time, output the alert based on the notification data.

The details of one or more examples are set forth in the accompanying drawings and the description below. Other features, objects, and advantages of the disclosure will be apparent from the description and drawings, and from the claims.

DETAILED DESCRIPTION

Figure 1:
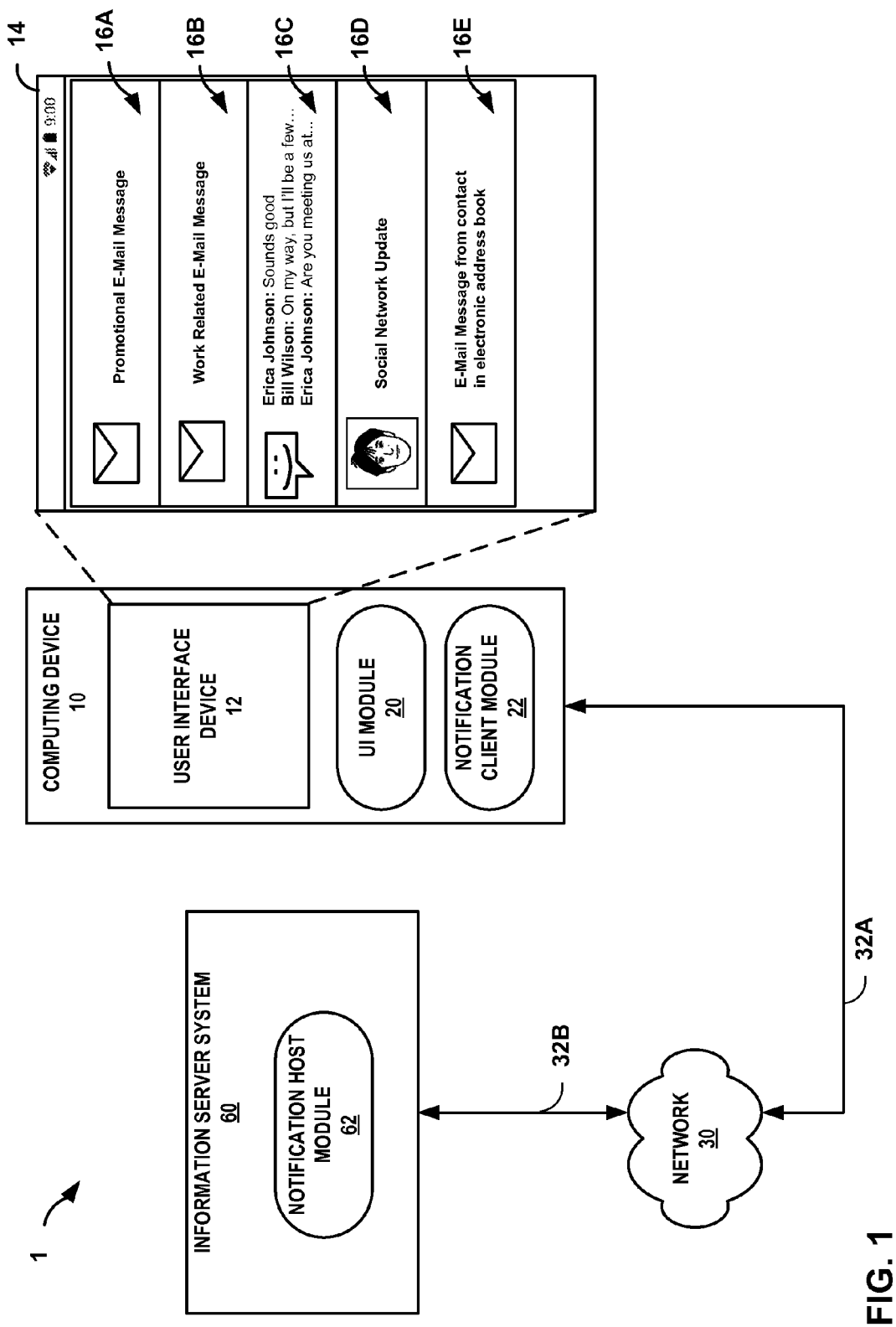
FIG. 1 is a conceptual diagram illustrating an example computing system that includes an example computing device configured to defer outputs of alerts associated with received notification data, in accordance with one or more aspects of the present disclosure.

In general, techniques of this disclosure may enable a computing device to defer the output of an alert (e.g., a visual indication, an audible indication, etc.) based on notification data until the computing device determines that a current time coincides with a time window for outputting the alert. For example, a computing device may receive notification data at various times of day from a notification service accessed by the computing device. The notification data may represent one or more notices that provide information (a communication message, an alarm, a reminder, etc.) that may be of importance to a user associated with the computing device. Rather than immediately output an alert indicative of the receipt of notification data each time that the computing device receives notification data, the computing device may wait to output (e.g., defer outputting) an alert until a later time.

For instance, after receiving notification data at a particular time, the computing device may determine a threshold amount of time (e.g., one minute, five minutes, one hour, etc.) to delay the output of an alert of the notification data. Then, the computing device may output the deferred alert based on the notification data, only in response to determining that the threshold amount of time has elapsed since the particular time that the notification data is received. In other words, the computing device may initiate a deferred output of alert based notification data until a particular notification delivery "time window" (e.g., a threshold amount of time after the receipt of the notification data).

In some examples, the computing device may defer the output of multiple alerts based on notification data until the computing device determines that the threshold amount of time associated with at least one deferred alert has elapsed. In other words, the computing device may output a single alert indicative of the receipt of all the notification data received by the computing device prior to determining that the threshold amount of time has elapsed for at least one deferred alert.

In this manner, the computing device may alert the user of the computing device of the receipt of new notification data without overwhelming the user by unnecessarily outputting an alert each time that new notification data is received. The computing device can defer the output of an alert indicative of the receipt of the notification data until a threshold amount of time has elapsed since receiving the notification data, such as when the computing device outputs an alert indicative of the receipt of additional notification data, or until the computing device determines that the current time corresponds to a maximum delayed amount time for altering the user to the receipt of the notification data.

By deferring the output of alerts based on notification data in this way, the computing device may output fewer alerts indicative of the receipt of notification data without deferring the receipt of notification data. Responsive to outputting fewer alerts, the computing device may receive fewer inputs from a user interacting with the computing device (e.g., to silence or otherwise inhibit frequent and/or numerous alerts at various times of the day). In turn, the computing device may receive fewer false inputs from the user and, as such, perform fewer operations and consume less electrical power.

FIG. 1 is a conceptual diagram illustrating an example computing system 1 that includes an example computing device 10 configured to defer outputs of alerts associated with received notification data, in accordance with one or more aspects of the present disclosure. Computing system 1 of FIG. 1 is an example computing system that includes computing device 10, information server system 60, and network 30.

Network 30 represents any public or private communication network, for instance, a cellular, Wi-Fi, and/or other type of network for transmitting data between computing devices. Computing device 10 and information server system 60 may send and receive data across network 30 using any suitable communication techniques. For example, computing device 10 may be operatively coupled to network 30 using network link 32A. Information server system 60 may be operatively coupled to network 30 by network link 32B. Network 30 may include network hubs, network switches, network routers, etc., that are operatively inter-coupled thereby providing for the exchange of information between computing device 10 and information server system 60. In some examples, network links 32A and 32B may be Ethernet, ATM or other network connections. Such connections may be wireless and/or wired connections.

Information server system 60 represents any suitable remote computing system, such as one or more desktop computers, laptop computers, mainframes, servers, cloud computing systems, etc. capable of sending and receiving information across network link 32B to network 30. In some examples, information server system represents a host server for a notification system service. One or more computing devices, such as computing device 10, may access a notification service hosted by information server system 60 for transmitting and/or receiving notification data between platforms, applications, and services executing at the one or more computing devices. In some examples, information server system 60 represents a cloud computing system that provides notification services through network 30 to one or more computing devices, such as computing device 10, that access the notification services via access to the cloud provided by information server system 60.

In the example of FIG. 1, information server system 60 includes notification host module 62. Notification host module 62 may perform operations described using software, hardware, firmware, or a mixture of hardware, software, and firmware residing in and/or executing at information server system 60. Information server system 60 may execute notification host module 62 with multiple processors or multiple devices. Information server system 60 may execute notification host module 62 as a virtual machine executing on underlying hardware. Notification host module 62 may execute as a service of an operating system or computing platform. Notification host module 62 may execute as one or more executable programs at an application layer of a computing platform.

Notification host module 62 may perform functions for routing notification data between one or more computing devices, such as computing device 10, over network 30. For example, notification host module 62 may perform functions for hosting a notification service and outputting notification data associated with platforms, applications, and/or services executing at computing device 10. For example, notification host module 62 may receive notification data indicative of an event associated with an e-mail message account (e.g., a new message received) associated with computing device 10 and send the notification data across network 30 to computing device 10. Computing device 10 may receive the notification data from notification host module 62 of information server system 60 via network link 32B and provide an alert at computing device 10 to indicate the receipt of the notification data.

In the example of FIG. 1, computing device 10 is a mobile computing device (e.g., a mobile phone). However, in other examples, computing device 10 may be a tablet computer, a personal digital assistant (PDA), a laptop computer, a gaming system, a media player, an e-book reader, a television platform, an automobile navigation system, a wearable computing device (e.g., a watch, eyewear, a glove), or any other type of mobile or non-mobile computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14), which may be associated with functionality provided by computing device 10. For example, UID 12 may present various user interfaces of components of a computing platform, operating system, applications, or services executing at or accessible by computing device 10 (e.g., an electronic message application, an Internet browser application, a mobile operating system, etc.). A user may interact with a respective user interface to cause computing device 10 to perform operations relating to a function.

Computing device 10 may include user interface ("UI") module 20, and notification client module 22. Modules 20 and 22 may perform operations described using software, hardware, firmware, or a mixture of hardware, software, and firmware residing in and/or executing at computing device 10. Computing device 10 may execute modules 20 and 22 with one or more processors. Computing device 10 may execute modules 20 and 22 as a virtual machine executing on underlying hardware. Modules 20 and 22 may execute as a service or component of an operating system or computing platform. Modules 20 and 22 may execute as one or more executable programs at an application layer of a computing platform. UID 12 and modules 20 and 22 may be otherwise arranged remotely to and remotely accessible to computing device 10, for instance, as one or more network services operating at network 30 in a network cloud.

Notification client module 22 may perform functions associated with receiving, managing, and otherwise handling at least a portion of the notification data generated and/or received by platforms, applications, and services executing at computing device 10. Notification client module 22 may cause UI module 20 to output an alert (e.g., an audible alert, a visual alert, a vibration, etc.) to indicate the receipt of the notification data by computing device 10. Notification client module 22 may receive notification data from information server system 60 and output the received notification data to a recipient platform, application, and/or service executing at computing device 10. Notification client module 22 may receive notification data generated by a platform, application, and/or service executing at computing device 10 and output the received notification data to information server system 60. Notification client module 22 may further receive notification data generated by one component of a platform, application, and/or service executing at computing device 10 and output the received notification data to a different component of a platform, application, and/or service executing at computing device 10.

As used throughout the disclosure, the term "notification data" is used to describe various types of information that may indicate the occurrence of an event associated with various platforms, applications, and services executing within an execution environment at one or more computing devices, such as computing device 10. For example, notification data may include, but is not limited to, information specifying an event such as: the receipt of a communication message (e.g., e-mail, instant message, SMS, etc.) by a messaging account associated with a computing device, the receipt of information by a social networking account associated with computing device 10, a reminder of a calendar event (meetings, appointments, etc.) associated with a calendar account of computer device 10, information generated and/or received by a third-party application executing at computing device 10, the transmittal and/or receipt of inter-component communications between two or more components of platforms, applications, and/or services executing at computing device 10, etc.

In addition to including information about a specific event, such as the various events described above, notification data may include various attributes or parameters embedded within the notification data that specify various characteristics of the notification data. For example the notification data may include a portion of data (e.g., a bit, metadata, a field, etc.) that specifies the origin of the notification data (e.g., the platform, application, and/or service that generated the notification data).

In some examples, the notification data may include a "priority rating" attribute assigned to the notification data by the notification service and/or the origin of the notification data. The priority rating may specify time of day for outputting, or a threshold amount of time to delay outputting an alert indicative of the receipt of the notification. For example, notification client module 22 may receive notification data and determine both the priority rating assigned to the notification data and the origin of the notification data. Notification client module 22 of computing device 10 may cause computing device 10, or a component of thereof, to output an alert associated with the notification data (e.g., to indicate the receipt of the notification data to a user of computing device 10) at a certain time of day, based on the priority rating, or within a certain amount of time, based on the priority rating, after receiving the notification data.

In some examples, the notification data may include a type attribute that specifies the type of notification data. Types of notification data may include a message type notification data, an application type, a calendar type, an event type, a promotion type, etc. The threshold amount of time which client module 22 may delay a notification may be based on the type of notification (e.g., greater for some types of notification data and shorter for other types of notification data).

UI module 20 may cause UID 12 to output user interface 14 or another example user interface, for display and, as a user of computing device 10 interacts with user interface presented at UID 12, UI module 20 may interpret inputs detected at UID 12 (e.g., as a user provides one or more gestures at a location of UID 12 at which user interface 14 or another example user interface is displayed). UI module 20 may relay information about the inputs detected at UID 12 to one or more associated platforms, operating systems, applications, and/or services executing at computing device 10 to cause computing device 10 to perform a function.

UI module 20 may receive information and instructions from one or more associated platforms, operating systems, applications, and/or services executing at computing device 10 (e.g., notification client module 22) for generating user interface 14. In addition, UI module 20 may act as an intermediary between the one or more associated platforms, operating systems, applications, and/or services executing at computing device 10 and various output devices of computing device 10 (e.g., speakers, LED indicators, vibrators, etc.) to produce output (e.g., graphical, audible, tactile, etc.) with computing device 10.

For instance, user interface 14 is one example graphical user interface for presenting one or more graphical indications of notification data received by computing device 10. User interface 14 includes graphical indications 16A-16E (collectively referred to herein as "graphical indications 16"). Each of graphical indications 16 corresponds to an alert being outputted by computing device 10 in response to notification data received at computing device 10. Graphical indication 16A represents a visual alert indicative of the receipt of notification data associated with a promotional e-mail message. Graphical indication 16B represents a visual alert indicative of the receipt of notification data associated a business or work related e-mail message. Graphical indication 16C represents a visual alert indicative of the receipt of notification data associated an instant message. Graphical indication 16D represents a visual alert indicative of the receipt of notification data associated with a social media network. Graphical indication 16E represents a visual alert indicative of the receipt of notification data associated a personal e-mail message from a contact in an electronic address book of computing device 10.

UI module 20 may receive, as input from notification client module 22, graphical information (e.g., text data, images data, etc.) based on the notification data that notification client module 22 receives. Additionally, UI module 20 may receive instructions associated with the graphical information from notification client module 22 for presenting the graphical information as one of graphical indications 16 within user interface 14. Based on the graphical information and the instructions received from notification client module 22, UI module 20 may cause UID 12 to present graphical indications 16 within user interface 14 to alert a user of computing device 10 of the receipt of notification data associated with each of graphical indications 16.

In operation, computing device 10 may receive, at a particular time, notification data. The notification data may indicate a threshold amount of time for which computing device 10 is to delay outputting an alert based on the notification data. For example, notification client module 22 may receive notification data specifying that a work related e-mail message was received by an e-mail account associated with computing device 10. Notification client module 22 may determine an attribute associated with the notification data and based on the attribute, determine when to cause UI module 20 to output an alert indicative of the receipt of the promotional e-mail message notification. For instance, the attribute may define five minutes as being a maximum threshold amount of time that notification client module 22 of computing device 10 may wait and delay outputting an alert indicative of the receipt of the notification data associated with the work related e-mail.

Computing device 10 may initiate, based on the threshold amount of time, a deferred output of the alert based on the notification data. In other words, rather than cause UI module 20 and computing device 10 to output an alert indicative of the received notification data immediately upon receipt, notification client module 22 may "defer the output" by adding an indication or record of the notification data to an internal queue or buffer associated with notification client module 22. Over time, notification client module 22 may add each portion of notification data received by notification client module 22 as additional indications or records to the internal queue or buffer along with a reference indicator as to the threshold amount of time associated with each portion of notification data within the queue. When notification client module 22 determines that the threshold amount of time for any one of the portions of notification data within the queue or buffer has elapsed, notification service module 22 may cause UI module 20 to output (at UID 12 or some other output device of computing device 10) a single alert indicative of each portion of notification data in the queue. After causing UI module 20 to output the single alert, notification client module 22 may empty the queue or buffer of each of the indications or records of notification data.

For instance, subsequent to receiving the notification data associated with the work related e-mail message, notification client module 22 may receive notification data associated with a promotional e-mail message received by the e-mail account of computing device 10 that has an attribute that indicates maximum of ten hours for which computing device 10 may delay outputting an alert. In addition, notification client module 22 may receive notification data associated with a social network account of computing device 10 which has an attribute that indicates a maximum of fifteen minutes for which computing device 10 may delay outputting an alert.

Rather than causing UI module 20 to output an alert, notification client module 22 may add the notification data associated with both the promotional e-mail message and the notification data associated with the social network account as individual indications or records to the internal queue or buffer along with the respective attributes of each.

Responsive to determining that the threshold amount of time has elapsed since the particular time, computing device 10 may output the alert based on the notification data. For example, notification client module 22 may determine that five minutes has passed since receiving the notification data associated with the work related e-mail message. Notification client module 22 may empty the internal queue or buffer containing all the indications or records of notification data received both prior to, and subsequent to receiving the notification data of the work related e-mail message. Notification client module 22 may cause UI module 20 to include graphical indications 16B-16E (with each being associated with a different portion of the notification data emptied from the internal queue) within user interface 14 and cause UI module 20 to output graphical indications 16B-16E as notification alerts at UID 12 and/or other types of alerts (e.g., audible, etc.) at other output devices of computing device 10.

In this way, rather than output an alert (e.g., a graphical indication, an audible indication, etc.) indicative of the receipt of new notification data each time that computing device 10 receives new notification data, computing device 10 may wait to output (e.g., defer output) an alert until a later time. In this manner, computing device 10 may alert the user of computing device 10 of the receipt of new notification data received by computing device 10 in a way that does not overwhelm the user with unnecessarily frequent alerts each time that new notification data is received. By deferring the output of alerts associated with the receipt of notification data in this way, computing device 10 may output fewer alerts indicative of the receipt of notification data and in response receive fewer inputs from a user interacting with computing device 10 (e.g., to silence or otherwise inhibit frequent and/or numerous alerts at various times of the day). In turn, computing device 10 may receive fewer false inputs from the user and, as such, perform fewer operations and consume less electrical power.

Figure 2:
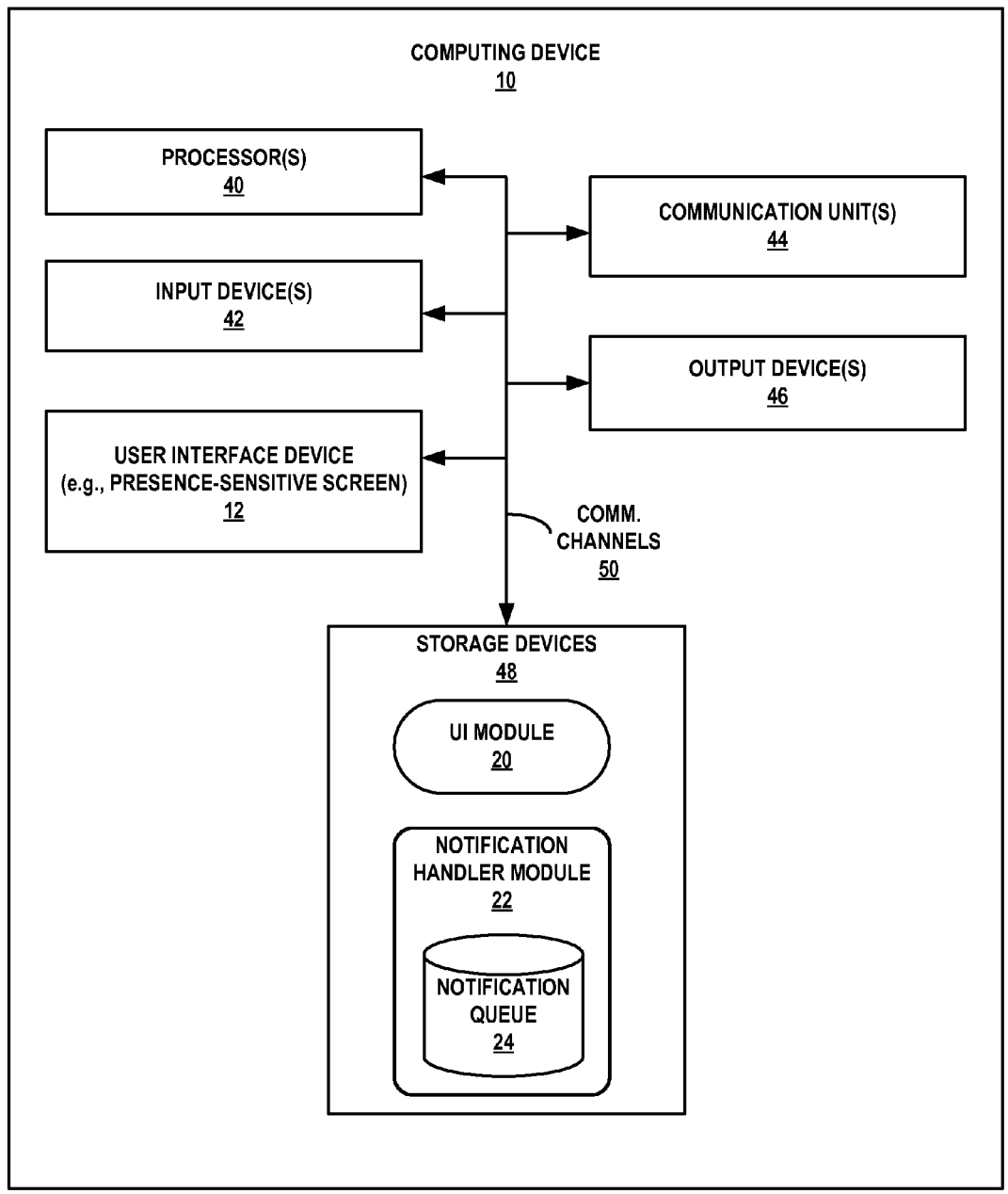
FIG. 2 is a block diagram illustrating an example computing device configured to defer outputs of alerts associated with received notification data, in accordance with one or more aspects of the present disclosure.

FIG. 2 is a block diagram illustrating example computing device 10 configured to defer outputs of alerts associated with received notification data, in accordance with one or more aspects of the present disclosure. Computing device 10 of FIG. 2 is described below within the context of system 1 of FIG. 1. FIG. 2 illustrates only one particular example of computing device 10 and many other examples of computing device 10 may be used in other instances. In the example of FIG. 2, computing device 10 may be a wearable computing device, a mobile computing device, or a non-portable (e.g., desktop, etc.) computing device. Computing device 10 of FIG. 2 may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, notification client module 22, and notification queue 24. UI module 20 and notification client module 22 may rely on information stored as notification queue 24 at storage device 48. In other words, as is described in more detail below, notification client module 22 may be operable by processors 40 to perform read/write operations on information, stored as notification queue 24, at storage device 48, to perform a function of computing device 10.

Communication channels 50 may interconnect each of the components 12, 20, 22, 24, 40, 42, 44, 46, and 48 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14 of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data (e.g., notification queue 24) that modules 20 and 22 access during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20 and 22, and notification queue 24.

One or more processors 40 may implement functionality and/or execute instructions within computing device 10. For example, processors 40 on computing device 10 may receive and execute instructions stored by storage devices 48 that execute the functionality of UI module 20 and notification client module 22. These instructions executed by processors 40 may cause computing device 10 to store information, such as one or more deferred alerts based on notification data at notification queue 24, within storage devices 48 during program execution. Processors 40 may execute instructions of modules 20 and 22 to cause UID 12 to output a deferred alert based on notification data for display at UID 12 as content of user interface 14. That is, modules 20 and 22 may be operable by processors 40 to perform various actions or functions of computing device 10, for instance, causing UID 12 to present user interfaces 14 at UID 12.

Notification queue 24 represents any suitable storage medium for storing and buffering notification data and/or deferred outputs of one or more alerts based on the notification data. For instance, notification queue 24 may be a queue, stack, or buffer for organizing data received over time. Notification client module 22 may initiate a deferred output of an alert based on notification data and cause notification queue 24 to store information related to the deferred output. Notification client module 22 may perform read/write operations for adding information to notification queue 24 (e.g., to initiate a deferred output of an alert) or removing information from notification queue 24 (e.g., to end the deferral of an output of an alert).

Notification client module 22 may perform multiple write operations to notification queue 24 to add information to notification queue 24 as each particular portion of notification data is received. For instance, notification client module 22 may initiate multiple deferred outputs of alerts (e.g., one deferred output for each different portion of notification data) received over time. Notification client module 22 may perform a single read operation to notification queue 24 to empty all the information contained within notification queue 24 in a single operation. For example, notification client module 22 may empty notification queue 24 and cause UI module 20 to output a single alert, indicative of all the deferred outputs of alerts contained within notification queue 24, at one time.

A stored or buffered deferred output of an alert may be stored at notification queue 24 as one or more indications or records of data within notification queue 24. Each indication or record may include actual notification data and/or a pointer to the location of the actual notification data stored in a memory bank associated with storage devices 48 of computing device 10. Types of actual notification data stored within an indication or record of notification queue 24 may include data indicative of a notification type, a notification priority level, a date/time stamp of receipt, a threshold amount of time for delaying the deferred output, etc. Notification client module 22 may initiate a deferred output of an alert based on notification data by storing the notification data at notification queue 24 that specifies a threshold amount of time, which if elapsed, causes notification client module 22 to cause UI module 20 to output the alert.

Notification client module 22 of computing device 10 may receive notification data at a particular time and determine a threshold amount of time for which to delay outputting an alert based on the notification data. Based on the threshold amount of time, notification client module 22 may initiate a deferred output of the alert based on the notification data. For example, notification client module 22 may determine an appropriate time after receiving notification data for causing UI module 20 to output an alert indicative of the receipt of the notification data. Notification client module 22 may initiate a deferred output of the alert based on the received notification data by creating an indication or record based on the received notification data at notification queue 24. The indication or record may specify, among other types of information, a threshold amount of time for which to delay outputting the alert.

To initiate a deferred output, notification client module 22 may process notification data received by computing device 10 to identify one or more attributes of the notification data that notification client module 22 uses to determine the threshold amount of time for delaying the output of an alert based on the notification data. In some examples, the attributes that notification client module 22 identifies may specify a priority level of the notification data. In other examples, the attributes may specify a type of the notification data. In still other examples, the attributes may specify an origin sender of the notification data, a delivery time window associated with the notification data, or other attribute specifying a characteristic of the information associated with the notification data.

Notification client module 22 may determine the threshold amount of time based on explicit information associated within the attributes (e.g., if certain information associated with the attribute expressly specifies a threshold amount of time for delaying the output) and/or based on implicit information associated with the attributes (e.g., based on one or more rules that notification client module 22 applies to certain information or value of a particular attribute).

Notification client module 22 may determine, based at least in part on a priority level of the notification data, the threshold amount of time indicated by the notification data. The priority level may indicate whether the information associated with the notification data is more important than other notification data that computing device 10 may receive. In some examples, a priority level attribute may have a numerical value (e.g., one through ten) and/or a label (high, medium, or low). Notification client module 22 may determine the threshold amount of time based on the numerical value and/or the label associated with the priority attribute.

In some examples, notification client module 22 may assign a shorter threshold amount of time to high priority notification data (e.g., an urgent e-mail, an instant message, an alarm, etc.) and a longer threshold amount of time to lesser (e.g., medium or low) priority notification data (e.g., a non-urgent e-mail, a product announcement, a reminder of a calendar event that occurs the next day, etc.). In some examples, the threshold amount of time associated with low priority notification data may correspond to one second, one minute, etc., while the threshold amount of time associated with medium priority notification data may correspond to five minutes, one hour, etc., and the threshold amount of time associated with low priority notification data may correspond to multiple hours, days, etc.

Notification client module 22 may determine, based at least in part on a type of the notification data, the threshold amount of time indicated by the notification data. For instance, the type of notification data may indicate whether the information associated with the notification data is more important than other types of notification data that computing device 10 may receive. A type of notification data may indicate a particular source of the notification data and/or whether the notification data is associated with a particular account (e.g., e-mail, instant message, calendar, application, etc.) of computing device 10.

Notification client module 22 may utilize one or more rules for determining a threshold amount of time for each type of notification data. For example, the threshold amount of time for a notification type that specifies one type of message or e-mail (e.g., a business or work related message or e-mail) may be five minutes whereas the threshold amount of time for a notification type that specifies notification data associated with a different type or message or e-mail (e.g., an e-commerce or commercial offer type message or e-mail) may be ten minutes. In some examples, notification client module 22 may determine that a threshold amount of time for an instant message or text message type notification is less than one minute whereas a threshold amount of time for an e-mail or other type of message is greater than one minute.

In some examples, notification client module 22 may determine a threshold amount of time for which to delay outputting an alert based on message based notification data, based on an address of a sender of the message based notification data. For instance, computing device 10 may determine a sender address associated with message based notification data. Notification client module 22 may determine that the sender address is contained as an entry within an electronic address book or contact list. Notification client module 22 may determine that the threshold amount of time associated with the message based notification data that has a sender attribute that corresponds to an address stored in an electronic address book or contact list of computing device 10 is shorter than the threshold amount of time associated with notification data received from an address that is not stored in the electronic address book or contact list.

In any event, whether based on priority, type, or some other attribute of the notification data, notification client module 22 may generate an indication or record at notification queue 24 that indicates a "time window" for outputting an alert based on the notification data. For instance, notification client module 22 may determine when the notification data was received (e.g., a time of receipt) and add the threshold amount of time associated with the notification data to determine a latest time, from the time of receipt, for causing UI module 20 to output an alert indicative of the notification. Responsive to determining that the threshold amount of time has elapsed since the particular time at which notification data is received, notification client module 22 may cause UI module 20 to output an alert based on notification data. Notification client module 22 may empty notification queue 24 and cause UI module 20 to output a single alert when the threshold amount of time has elapsed indicative of all the deferred outputs of alerts emptied from notification queue 24.

In some examples, an alert comprises an indication of a receipt of notification data For instance, in some examples, the indication of the receipt of the notification data comprises at least one of a visual indication, an audible indication, and a tactile feedback indication to indicate that computing device 10 received notification data.

In some examples, the notification data received by computing device 10 comprises communication information associated with a communication account of the computing device. For instance, notification client module 22 may receive message based notification data indicating that an e-mail or instant message associated with an e-mail or instant message account has been received.

In some examples, notification queue 24 and/or notification client module 22 may be associated with an operating system of computing device 10 or a platform layer of computing device 10 (e.g., an operating layer distinct from an application layer of computing device 10). In other words, notification queue 24 and/or notification client module 22 may execute as a background thread, process, or service of computing device 10 for managing and controlling how and when computing device 10 outputs alerts indicative of the receipt of notification data. The applications, platforms, services, or other components of computing device 10 that receive notification data may continue to receive the notification data, despite the deferral of alerts based on the notification data by notification client module 22 at notification queue 24. For instance, a user of computing device 10 may access an application that receives notification data and view content associated with the notification data after the notification data is received even if notification client module 22 initiates a deferred output of an alert based on the notification data. However, by initiating a deferred output of the alert based on the notification data, notification client module 22 prevents the user from being alerted to the receipt of the notification data (e.g., audibly, visually, etc.) until notification client module 22 determines that a threshold amount of time for delaying an alert of the notification data has elapsed since the notification data was received.

Figure 3:
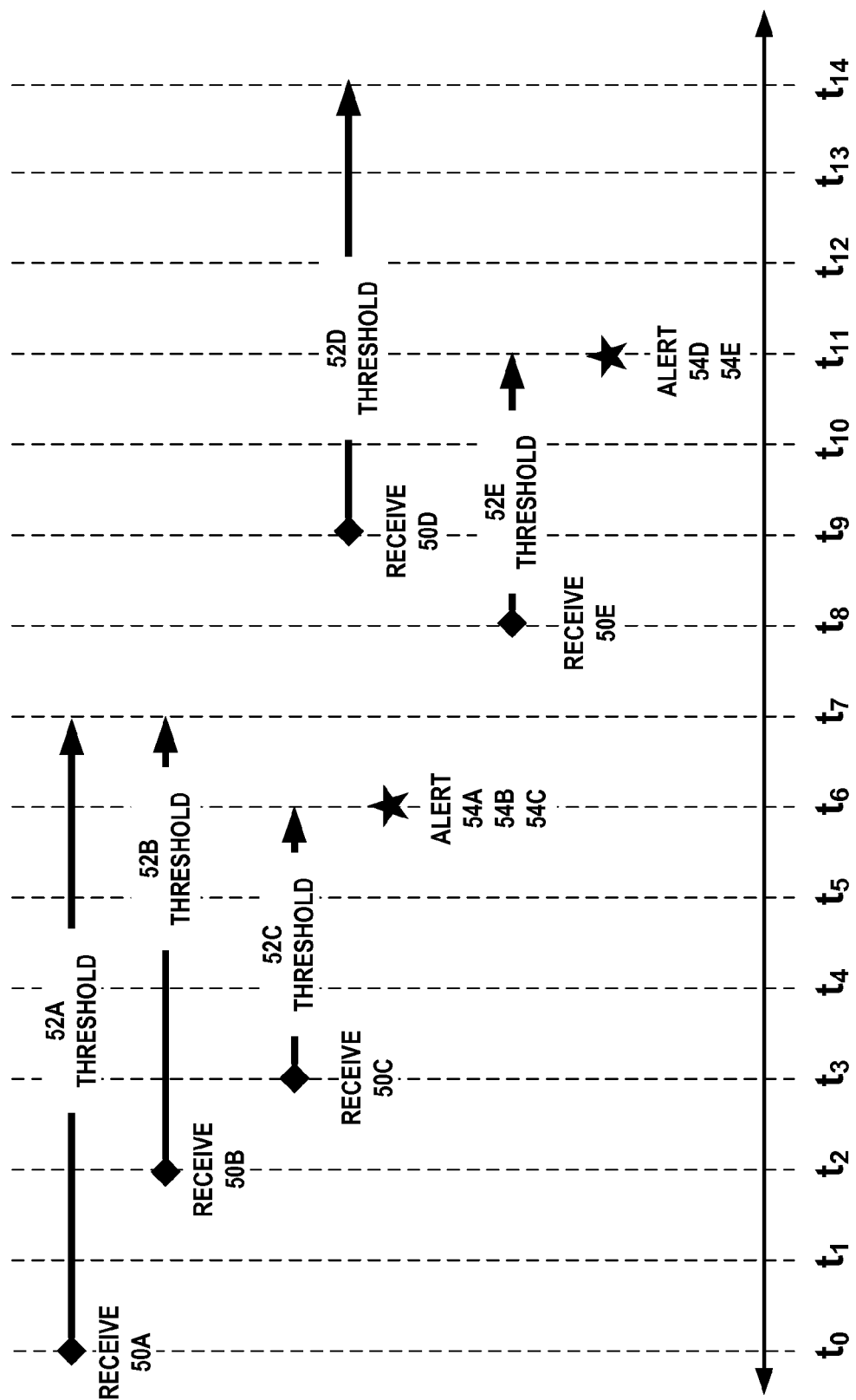
FIG. 3 is a timing diagram illustrating timing characteristics of an example computing device configured to defer outputs of alerts associated with received notification data, in accordance with one or more aspects of the present disclosure.

FIG. 3 is a timing diagram illustrating timing characteristics of example computing device 10 configured to defer outputs of alerts associated with received notification data, in accordance with one or more aspects of the present disclosure. FIG. 3 is described below within the context of system 1 of FIG. 1 and computing device 10 of FIG. 2. FIG. 3 illustrates a period of time that starts at $t_0$ and ends at $t_{14}$ during which computing device 10 receives notification data, initiates a deferred output of several alerts based on the notification data, and outputs two different alerts based on the notification data.

For example, at time $t_0$, notification client module 22 of computing device 10 may receive notification data 50A associated with a promotional e-mail message received by an e-mail account of computing device 10. Notification client module 22 may determine threshold amount of time 52A for which to delay outputting alert 52A based on notification data 50A. For example, based on an attribute of notification data 50A, notification client module 22 may determine that notification data 50A contains low priority notification data and threshold 52A of notification data 50A corresponds to seven units of time. Notification client module 22 may initiate a deferred output of alert 52A based on notification data 50A by creating an indication or record at notification queue 24 which specifies that alert 52A is to be outputted by UI module 20 no later than at seven units (e.g., seconds, minutes, etc.) of time after receiving notification data 50A (e.g., time $t_7$ corresponds to a time that occurs seven units of time after time $t_0$).

At time $t_2$, notification client module 22 of computing device 10 may receive notification data 50B associated with a work related e-mail message received by an e-mail account of computing device 10. Notification client module 22 may determine threshold amount of time 52B for which to delay outputting alert 52B based on notification data 50B. For example, based on an attribute of notification data 50B, notification client module 22 may determine that notification data 50B contains medium priority notification data and threshold 52B of notification data 50B corresponds to five units of time. Notification client module 22 may initiate a deferred output of alert 52B based on notification data 50B by creating an indication or record at notification queue 24 which specifies that alert 52B is to be outputted by UI module 20 no later than at five units of time after receiving notification data 50B (e.g., time $t_7$ corresponds to a time that occurs five units of time after time $t_2$).

At time $t_3$, notification client module 22 of computing device 10 may receive notification data 50C associated with an instant message received by an instant message account of computing device 10. Notification client module 22 may determine threshold amount of time 52C for which to delay outputting alert 52C based on notification data 50C. For example, based on an attribute of notification data 50C, notification client module 22 may determine that notification data 50C contains high priority notification data and threshold 52C of notification data 50C corresponds to three units of time. Notification client module 22 may initiate a deferred output of alert 52C based on notification data 50C by creating an indication or record at notification queue 24 which specifies that alert 52C is to be outputted by UI module 20 no later than at three units of time after receiving notification data 50C (e.g., time $t_6$ corresponds to a time that occurs three units of time after time $t_3$).

At time $t_6$, notification client module 22 may compare the indications or records associated with each of the deferred outputs of notification queue 24 (e.g., alerts 54A, 54B, and 54C) to the current time. Responsive to determining that neither threshold 52A nor threshold 52B has elapsed, notification client module 22 may continue to defer the output of alerts 54A and 54B by not removing the deferred outputs of alerts 54A and 54B from notification queue 24. However, responsive to determining that threshold amounts of time 52C, has elapsed since receiving notification 50C at time $t_3$, notification client module 22 may empty notification queue 24 of all deferred outputs and cause UI module 20 of computing device 10 to output alerts 54A, 54B, and 54C based on notification data 50A, notification data 50B, and further based on notification data 50C.

Said differently, once notification client module 22 determines that a threshold associated with at least one deferred output (e.g., deferred output of alert 54C received subsequent to deferred outputs 54A and 54B) stored at notification queue 24 has elapsed since computing device 10 received the corresponding notification data, notification client module 22 may empty notification queue 24 and cause UI module 20 to output a single alert indicative of the receipt of all the notification data received prior to the current time. In some examples, an alert may be a visual alert, an audible alert, a haptic feedback alert, and/or other tactile or non-tactile feedback alert. For instance, a visual alert indicative of the receipt of all the notification data received prior to time t6 may include graphical indications 16A-16C of user interface 14 displayed at UID 12.

At time $t_8$, notification client module 22 of computing device 10 may receive notification data 50E associated with a personal e-mail message received by an e-mail account of computing device 10 from a contact within an electronic address book of computing device 10. Notification client module 22 may determine threshold amount of time 52E for which to delay outputting alert 52E based on notification data 50E. For example, based on an attribute of notification data 50E that indicates the e-mail message was received from the contact of the electronic address book of computing device 10, notification client module 22 may determine that notification data 50E contains high priority notification data and threshold 52E of notification data 50E corresponds to three units of time. Notification client module 22 may initiate a deferred output of alert 52E based on notification data 50E by creating an indication or record at notification queue 24 which specifies that alert 52E is to be outputted by UI module 20 no later than at three units of time after receiving notification data 50E (e.g., time $t_{11}$ corresponds to a time that occurs three units of time after time $t_8$).

At time $t_9$, notification client module 22 of computing device 10 may receive notification data 50D associated with a social media network received by a social media account of computing device 10. Notification client module 22 may determine threshold amount of time 52D for which to delay outputting alert 52D based on notification data 50D. For example, based on an attribute of notification data 50D, notification client module 22 may determine that the type of notification data 50D is of social media network type and therefore determine that notification data 50D contains medium priority notification data and threshold 52D of notification data 50D corresponds to five units of time. Notification client module 22 may initiate a deferred output of alert 52D based on notification data 50D by creating an indication or record at notification queue 24 which specifies that alert 52D is to be outputted by UI module 20 no later than at five units of time after receiving notification data 50D (e.g., time $t_{14}$ corresponds to a time that occurs five units of time after time $t_9$).

At time $t_{11}$, notification client module 22 may compare the indications or records associated with each of the deferred outputs of notification queue 24 (e.g., alerts 54D and 54E) to the current time. Responsive to determining that threshold 52D has not elapsed, notification client module 22 may continue to defer the output of alerts 54D by not removing the deferred outputs of alerts 54D and 54E from notification queue 24. However, responsive to determining that threshold amounts of time 52E, has elapsed since receiving notification 50E at time $t_8$, notification client module 22 may empty notification queue 24 of all deferred outputs and cause UI module 20 of computing device 10 to output alerts 54D and 54E based on notification data 50D and further based on notification data 50E.

Said differently, once notification client module 22 determines that a threshold associated with at least one deferred output (e.g., deferred output of alert 54E received prior to deferred output 54D) stored at notification queue 24 has elapsed since computing device 10 received the corresponding notification data, notification client module 22 may empty notification queue 24 and cause UI module 20 to output a single alert indicative of the receipt of all the notification data received prior to the current time. For instance, a visual alert indicative of the receipt of all the notification data received subsequent to time $t_6$ and prior to time $t_{11}$ may include graphical indications 16D and 16E of user interface 14 displayed at UID 12.

Figure 4:
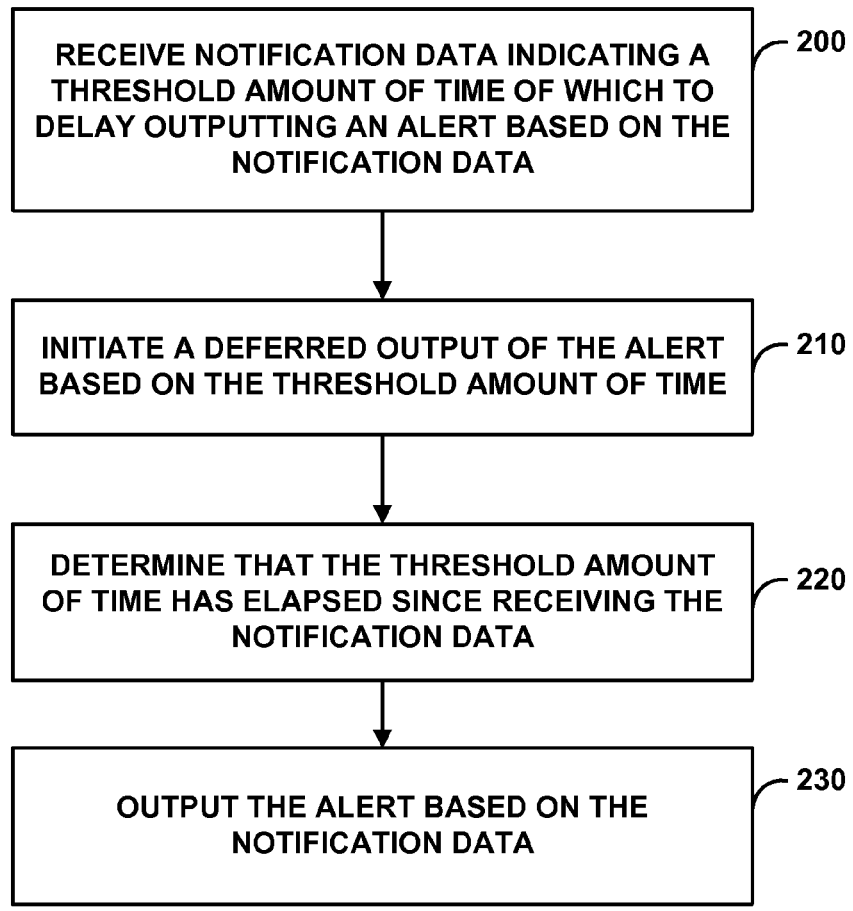
FIG. 4 is a flowchart illustrating example operations of an example computing device configured to defer outputs of alerts associated with received notification data, in accordance with one or more aspects of the present disclosure.

FIG. 4 is a flowchart illustrating example operations of example computing device 10 configured to defer outputs of alerts associated with received notification data, in accordance with one or more aspects of the present disclosure. The operations of computing device 10 are described within the context of system 1 of FIG. 1 and computing device 10 of FIG. 2.

Computing device 10 may receive notification data indicating a threshold amount of time of which to delay outputting an alert based on the notification data (200). For example, notification client module 22 may receive notification data from notification host module 62 via link 32A and network 30. The notification data may represent an indication of the receipt of an e-mail or instant message associated with a messaging account of computing device 10.

Computing device 10 may initiate a deferred output of the alert based on the threshold amount of time (210). For instance, rather than immediately cause UI module 20 to output a visual, audible, haptic feedback, and/or other tactile or non-tactile type of alert to indicate the receipt of the e-mail or instant message notification data, notification client module 22 may create an indication or record of the receipt of the notification data and a corresponding deferred alert output, at notification queue 24 to delay the output of the alert until a later time. Notification client module 22 may determine a threshold amount of time of which to delay outputting the alert based on a type, a priority, and/or other attribute associated with the notification data.

Computing device 10 may determine that the threshold amount of time has elapsed since receiving the notification data (220). For example, notification client module 22 may include a timer that periodically interrupts notification client module 22 and causes notification client module 22 to determine whether the threshold time associated with at least one indication or record of notification data in notification queue 24 has elapsed. Notification client module 22 may determine that if the current time is subsequent to, or at least equivalent to, a time that is subsequent to the particular time that notification data was received, by the threshold amount of time, that the threshold amount of time has elapsed.

Computing device 10 may output the alert based on the notification data (230). For instance, responsive to determining that the threshold amount of time has elapsed, notification client module 22 may empty notification queue 24, and cause UI module 20 to output a single alert indicative of each of the deferred outputs associated with notification data received prior to the current time.

Figure 5:
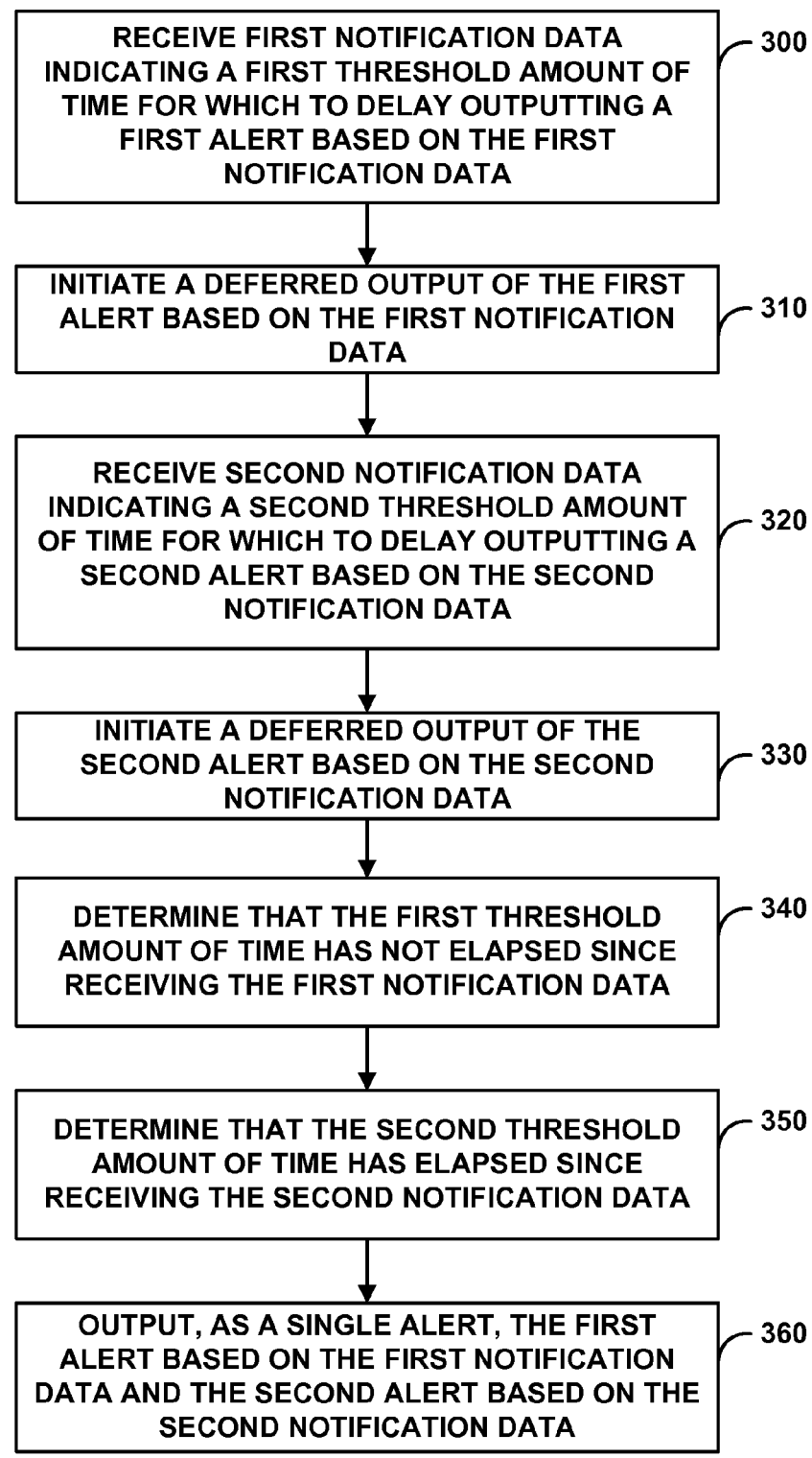
FIG. 5 is a flowchart illustrating further example operations of an example computing device configured to defer outputs of alerts associated with received notification data, in accordance with one or more aspects of the present disclosure.

FIG. 5 is a flowchart illustrating further example operations of example computing device 10 configured to defer outputs of alerts associated with received notification data, in accordance with one or more aspects of the present disclosure. The operations of computing device 10 are described within the context of system 1 of FIG. 1 and computing device 10 of FIG. 2.

Computing device 10 may receive first notification data indicating a first threshold amount of time for which to delay outputting a first alert based on the first notification data (300). For example, computing device 10 may receive first notification data indicating that a business or work related e-mail message associated with an e-mail account of computing device 10 was received. Notification client module 22 may determine that the priority of the first notification data is a medium level priority based on an attribute of the first notification data (e.g. a label, an address of a sender of the e-mail, etc.). Based on the priority of the first notification data, notification client module 22 may determine a first threshold amount of time for which to delay the output of a first alert indicative of the receipt of the first notification data.

Computing device 10 may initiate a deferred output of the first alert based on the first notification data (310). For instance, notification client module 22 may store, at a data buffer of computing device 10 (e.g., notification queue 24), a first indication of the first notification. In other words, notification client module 22 may create an indication or record of the first notification data at notification queue 24 that includes an indication of the first threshold amount of time for which to delay the output of the first alert based on the first notification data.

Computing device 10 may receive second notification data indicating a second threshold amount of time for which to delay outputting a second alert based on the second notification data (320). For example, computing device 10 may receive second notification data indicating that an instant message associated with an instant message account of computing device 10 was received. Notification client module 22 may determine that the priority of the second notification data is a high level priority based on an attribute of the second notification data (e.g. a label, an address of a sender of the message, etc.). Based on the priority of the second notification data, notification client module 22 may determine a second threshold amount of time for which to delay the output of a second alert indicative of the receipt of the second notification data.

Computing device 10 may initiate a deferred output of the second alert based on the second notification data (330). For instance, notification client module 22 may store, at a data buffer of computing device 10 (e.g., notification queue 24), a second indication of the second notification. In other words, in addition to the first indication or record created at notification queue 24 that specifies receipt of the first notification data, notification client module 22 may create an indication or record of the second notification data at notification queue 24 that includes an indication of the second threshold amount of time for which to delay the output of the second alert based on the second notification data.

Computing device 10 may determine that the first threshold amount of time has not elapsed since receiving the first notification data (340). For instance, based on the indication or record of the first notification data stored at notification queue 24, notification client module 22 may determine that the current time of computing device 10 does not meet or exceed the particular time at which the first notification data was received, by the first threshold amount of time.

Computing device 10 may determine that the second threshold amount of time has elapsed since receiving the second notification data (350). For instance, based on the indication or record of the second notification data stored at notification queue 24, notification client module 22 may determine that the current time of computing device 10 does meet or exceed the particular time at which the second notification data was received, by the second threshold amount of time.

Computing device 10 may output, as a single alert, the first alert based on the first notification data and the second alert based on the second notification data (360). For example, responsive to determining that the second threshold amount of time has elapsed since the particular time at which the second notification data was received, notification client module 22 may remove, from the data buffer (e.g., notification queue 24), the first indication or record of the first notification data and the second indication or record of the second notification data, and cause UI module 20 to output the first alert based on the first notification data and the second alert based on the second notification data as a single graphical or visual alert of the first and second notification data at UID 12.

Clause 1. A method, comprising: receiving, by a computing device, at a particular time, notification data, the notification data indicating a threshold amount of time for which the computing device is to delay outputting an alert based on the notification data; initiating, by the computing device and based on the threshold amount of time, a deferred output of the alert based on the notification data; and responsive to determining that the threshold amount of time has elapsed since the particular time, outputting, by the computing device, the alert based on the notification data.

Clause 2. The method of clause 1, wherein: the notification data is first notification data, the threshold amount of time is a first threshold amount of time, and the particular time is a first particular time, the method further comprising: receiving, by the computing device, at a second particular time, second notification data, the second notification data indicating a second threshold amount of time for which the computing device is to delay outputting an alert based on the second notification data; responsive to determining that the second threshold amount of time has elapsed since the second particular time, outputting, by the computing device, an alert based on both the first notification data and the second notification data, wherein the second threshold amount of time is less than the first threshold amount of time.

Clause 3. The method of clause 2, wherein the second particular time is subsequent to the first particular time.

Clause 4. The method of any of clauses 2-3, wherein the second particular time is prior to the first particular time.

Clause 5. The method of any of clauses 2-4, further comprising: storing, by the computing device, at a data buffer of the computing device, a first indication of the first notification data and a second indication of the second notification data; and responsive to determining that the first threshold amount of time has elapsed since the first particular time, removing, by the computing device, from the data buffer, the first indication of the first notification data and the second indication of the second notification data, and outputting, by the computing device, the alert based on the first notification data and further based on the second notification data.

Clause 6. The method of clause 5, wherein the data buffer is associated with an operating system of the computing device.

Clause 7. The method of any of clauses 1-6, wherein the notification data comprises communication information associated with a communication account of the computing device.

Clause 8. The method of any of clauses 1-7, the method further comprising: determining, by the computing device, based at least in part on a type of the notification data, the threshold amount of time indicated by the notification data.

Clause 9. The method of any of clauses 1-8, the method further comprising: determining, by the computing device, based at least in part on a priority level of the notification data, the threshold amount of time indicated by the notification data.

Clause 10. The method of any of clauses 1-9, wherein the alert comprises an indication of the receipt of the notification data, the indication of the receipt of the notification data comprising at least one of a visual indication, an audible indication, and a haptic feedback indication.

Clause 11. A computing system comprising: at least one processor; and at least one module operable by the at least one processor to: receive, at a particular time, notification data, the notification data indicating a threshold amount of time for which the computing system is to delay outputting an alert based on the notification data; initiate, based on the threshold amount of time, a deferred output of the alert based on the notification data; and responsive to determining that the threshold amount of time has elapsed since the particular time, output the alert based on the notification data.

Clause 12. The computing system of clause 11, wherein: the notification data is first notification data, the threshold amount of time is a first threshold amount of time, the particular time is a first particular time, and the at least one module is further operable by the at least one processor to: receive at a second particular time, second notification data, the second notification data indicating a second threshold amount of time for which the computing device is to delay outputting an alert based on the second notification data; responsive to determining that the second threshold amount of time has elapsed since the second particular time, output an alert based on both the first notification data and the second notification data, wherein the second threshold amount of time is less than the first threshold amount of time.

Clause 13. The computing system of clause 12, wherein the second particular time is subsequent to the first particular time.

Clause 14. The computing system of any of clauses 12-13, wherein the second particular time is prior to the first particular time.

Clause 15. The computing system of any of clauses 12-14, further comprising a data buffer, wherein the at least one module is further operable by the at least one processor to: store, at the data buffer, a first indication of the first notification data and a second indication of the second notification data; and responsive to determining that the first threshold amount of time has elapsed since the first particular time: remove, from the data buffer, the first indication of the first notification data and the second indication of the second notification data, and output the alert based on the first notification data and further based on the second notification data.

Clause 16. The computing system of clause 15, wherein the data buffer is associated with an operating system of the computing system.

Clause 17. The computing system of any of clauses 11-16, wherein the notification data comprises communication information associated with a user of the computing system.

Clause 18. The computing system of any of clauses 11-17, wherein the at least one module is further operable by the at least one processor to determine, based at least in part on a type of the notification data, the threshold amount of time indicated by the notification data.

Clause 19. The computing system of any of clauses 11-18, wherein the at least one module is further operable by the at least one processor to determine, based at least in part on a priority level of the notification data, the threshold amount of time indicated by the notification data.

Clause 20. A computer-readable storage medium comprising instructions that, when executed, configure one or more processors of a computing system to: receive, at a particular time, notification data, the notification data indicating a threshold amount of time for which the computing system is to delay outputting an alert based on the notification data; initiate, based on the threshold amount of time, a deferred output of the alert based on the notification data; and responsive to determining that the threshold amount of time has elapsed since the particular time, output the alert based on the notification data.

Clause 21. A method comprising: receiving, by a computing device and at a first time, first notification data, the first notification data indicating a first interval of time for which the computing device is to delay outputting an alert based on the first notification data; responsive to determining that the first interval of time has not elapsed since the first time, initiating, by the computing device, a deferred output of the alert; receiving, by the computing device and at a second time, second notification data, the second notification data indicating a second interval of time for which the computing device is to delay outputting an alert based on the second notification data, wherein the second interval of time is less than the first interval of time; and responsive to determining that the second interval of time has elapsed since the second time, outputting, by the computing device, the alert based on the first notification data and the alert based on the second notification data.

Clause 22. A computing device comprising means for performing any of the methods of clauses 1-10 and 21.

Clause 23. A computer-readable storage medium encoded with instructions for causing one or more programmable processors to perform any of the methods recited by clauses 1-10 and 21.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   responsive to receiving first notification data at a first particular time, initiating, by a computing device, a deferred output of a first alert, the first alert indicating that the computing device received the first notification data;
   responsive to receiving second notification data at a second particular time, initiating, by the computing device, a deferred output of a second alert, the second alert indicating that the computing device received the second notification data; and
   prior to elapsing of a first threshold amount of time since the first particular time and responsive to determining that a second threshold amount of time has elapsed since the second particular time, outputting, by the computing device, based on the deferred output of the second alert, a third alert, the third alert indicative of receipt of both the first notification data and the second notification data.

2. The method of claim 1, wherein:
   the first threshold amount of time is a first maximum amount of time for which the computing device is permitted to delay output of the first alert, and
   the second threshold amount of time is a second maximum amount of time for which the computing device is permitted to delay output of the second alert.

3. The method of claim 1, further comprising:
   determining the first threshold amount of time based at least in part on an attribute associated with the first notification data.

4. The method of claim 3, wherein the attribute specifies a type of the first notification data and the first threshold amount of time is determined based on whether the type of the first notification data is a message type, an application type, a calendar type, an event type, a promotion type.

5. The method of claim 3, wherein the attribute specifies a priority level of the first notification data and the first threshold amount of time is determined based on the priority level of the first notification data.

6. The method of claim 3, wherein the attribute specifies an origin of the notification data, the origin being selected from a group consisting of an account, a platform, or a computing system from which the first notification data is received.

7. The method of claim 1, wherein the second particular time is different from the first particular time.

8. The method of claim 1, wherein:
   the second particular time is subsequent to the first particular time, or
   the second particular time is prior to the first particular time.

9. The method of claim 1, wherein at least one of the first notification data or the second notification data comprises communication information associated with a communication account of the computing device.

10. The method of claim 1, wherein the third alert comprises an indication of receipt of the first notification data and receipt of the second notification data, the indication of receipt of the first notification data and receipt of the second notification data comprising at least one of a visual indication, an audible indication, or a haptic feedback indication.

11. A computing device comprising:
    at least one processor; and
    at least one module operable by the at least one processor to:
    responsive to receiving first notification data at a first particular time, initiate, a deferred output of a first alert, the first alert indicating that the computing device received the first notification data;
    responsive to receiving second notification data at a second particular time, initiate a deferred output of a second alert, the second alert indicating that the computing device received the second notification data; and
    prior to elapsing of a first threshold amount of time since the first particular time and responsive to determining that a second threshold amount of time has elapsed since the second particular time, output, based on the deferred output of the second alert, a third alert indicative of receipt of both the first notification data and the second notification data.

12. The computing device of claim 11, wherein:
    the first threshold amount of time is a first maximum amount of time for which the computing device is permitted to delay outputting the first alert; and
    the second threshold amount of time is a second maximum amount of time for which the computing device is permitted to delay outputting the second alert.

13. The computing device of claim 11, wherein the second threshold amount of time is different from the first threshold amount of time.

14. The computing device of claim 11, wherein the at least one module is further operable by the at least one processor to determine the first threshold amount of time based at least in part on an attribute associated with first notification data.

15. The computing device of claim 14, wherein the attribute specifies a type of the first notification data and the at least one module is further operable by the at least one processor to determine the first threshold amount of time based on whether the type of the first notification data is either a message type, an application type, a calendar type, an event type, a promotion type.

16. The computing device of claim 14, wherein the attribute specifies a priority level of the first notification data and the at least one module is further operable by the at least one processor to determine the first threshold amount of time based on the priority level of the first notification data.

17. The computing device of claim 14, wherein the attribute specifies an origin of the notification data, the origin being selected from a group consisting of an account, a platform, or a computing system from which the first notification data is received.

18. A non-transitory computer-readable storage medium comprising instructions that, when executed, configure one or more processors of a computing device to:
responsive to receiving first notification data at a first particular time, initiate, a deferred output of a first alert, the first alert indicating that the computing device received the first notification data;
responsive to receiving second notification data at a second particular time, initiate a deferred output of a second alert, the second alert indicating that the computing device received the second notification data; and
prior to elapsing of a first threshold amount of time since the first particular time and responsive to determining that a second threshold amount of time has elapsed since the second particular time, output, based on the deferred output of the second alert, a third alert indicative of receipt of both the first notification data and the second notification data.

19. The non-transitory computer-readable storage medium of claim 18, wherein the second particular time is different from the first particular time.

20. The non-transitory computer-readable storage medium of claim 18, wherein:
the second particular time is subsequent to the first particular time; or
the second particular time is prior to the first particular time.

* * * * *